US012387277B2

(12) United States Patent
Liu et al.

(10) Patent No.: US 12,387,277 B2
(45) Date of Patent: Aug. 12, 2025

(54) LEARNING USER ACTIONS TO IMPROVE TRANSACTION CATEGORIZATION

(71) Applicant: Intuit Inc., Mountain View, CA (US)

(72) Inventors: Juan Liu, Cupertino, CA (US); Lei Pei, Sunnyvale, CA (US); Ying Sun, Foster City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/608,877

(22) Filed: Mar. 18, 2024

(65) Prior Publication Data

US 2024/0221089 A1 Jul. 4, 2024

Related U.S. Application Data

(63) Continuation of application No. 17/162,365, filed on Jan. 29, 2021, now Pat. No. 11,935,135.

(51) Int. Cl.
*G06Q 40/12* (2023.01)
*G06N 3/04* (2023.01)
(Continued)

(52) U.S. Cl.
CPC ............. *G06Q 40/12* (2013.12); *G06N 3/04* (2013.01); *G06N 3/08* (2013.01); *G06Q 30/018* (2013.01)

(58) Field of Classification Search
CPC ............. G06F 16/907; G06F 16/285; G06F 16/24573; G06Q 30/0255; G06Q 40/12;
(Continued)

(56) References Cited

U.S. PATENT DOCUMENTS 9,818,067 B2 * 11/2017 Miranda ................. G06N 20/00
10,832,162 B2 * 11/2020 Chen ......................... G06N 5/02
(Continued)

OTHER PUBLICATIONS

Ning, Y., et al., "A Gradient-based Adaptice Learning Framework for Efficient Personal Recommendation", Aug. 27-31, 2017, 9 pages.
(Continued)

*Primary Examiner* — Florian M Zeender
*Assistant Examiner* — Milena Racic
(74) *Attorney, Agent, or Firm* — Lathrop GPM LLP

(57) ABSTRACT

A method may include executing a baseline classifier on unreviewed transaction features of an unreviewed transaction record to obtain a baseline account identifier, and executing a comparison model on (i) an unreviewed transaction vector of the unreviewed transaction record and (ii) reviewed transaction vectors to obtain comparison scores. The reviewed transaction vectors may correspond to reviewed transaction records each having a user-approved account identifier. The method may further include selecting, using the comparison scores, a reviewed transaction record. The reviewed transaction record may correspond to a comparison score. The comparison score may correspond to a user-approved account identifier of the reviewed transaction record. The method may further include selecting, using the comparison score, one of the baseline account identifier and the user-approved account identifier to obtain a selected account identifier, and presenting the selected account identifier for the unreviewed transaction record.

18 Claims, 9 Drawing Sheets

(51) Int. Cl.
*G06N 3/08* (2023.01)
*G06Q 30/018* (2023.01)

(58) Field of Classification Search
CPC .......... G06N 20/00; G06N 3/045; G06N 3/08;
G06N 3/082; G06V 10/82
See application file for complete search history.

(56) References Cited

U.S. PATENT DOCUMENTS

| | | | | |
|---|---|---|---|---|
| 10,956,731 | B1* | 3/2021 | Gupta | G06F 16/45 |
| 10,956,986 | B1 | 3/2021 | Ran | |
| 11,308,562 | B1* | 4/2022 | Ran | G06Q 40/12 |
| 11,368,466 | B2* | 6/2022 | Vigna | H04L 63/105 |
| 11,372,828 | B1* | 6/2022 | Bendapudi | G06F 16/258 |
| 11,695,653 | B2* | 7/2023 | Agarwal | H04L 41/5048 |
| | | | | 709/223 |
| 11,748,382 | B2* | 9/2023 | Saillet | G06N 7/01 |
| | | | | 707/737 |
| 2009/0222365 | A1 | 9/2009 | McGlynn | |
| 2016/0210631 | A1* | 7/2016 | Ramasubramanian | |
| | | | | G06Q 20/4016 |
| 2016/0358070 | A1* | 12/2016 | Brothers | G06N 3/045 |
| 2017/0124483 | A1* | 5/2017 | Huang | G06N 20/10 |
| 2019/0138509 | A1* | 5/2019 | von Rickenbach | |
| | | | | G06F 11/0727 |
| 2020/0074565 | A1 | 3/2020 | Dotter | |
| 2022/0015182 | A1 | 1/2022 | Cohen | |
| 2022/0277399 | A1 | 9/2022 | Pei | |
| 2023/0185969 | A1* | 6/2023 | Singh | G06F 11/2064 |
| | | | | 713/193 |
| 2023/0409578 | A1* | 12/2023 | Franklin | G06F 16/215 |
| 2023/0419122 | A1* | 12/2023 | Hazimeh | G06N 3/084 |

OTHER PUBLICATIONS

Chen, M. X., et al., "Gmail Smart Compose: Real-Time Assisted Writing", May 17, 2019, 9 pages.

Mazare, P., et al., "Training Millions of Personalized Dialogue Agents", Sep. 6, 2018, 5 pages.

Koch, G., et al., "Siamese Neural Networks for One-Shot Image Recognition", Proceedings of the 32nd International Conference on Machine Learning, Jul. 6-11, 2015, 8 pages.

* cited by examiner

LEARNING USER ACTIONS TO IMPROVE TRANSACTION CATEGORIZATION

RELATED APPLICATIONS

This application is a continuation application of U.S. application Ser. No. 17/162,365, filed Jan. 29, 2021, the entirety of which is hereby incorporated by reference.

BACKGROUND

Transaction categorization is often an important part of transaction processing. For example, a transaction may be categorized into an account included in a chart of accounts (COA). An automated transaction categorization method would enhance user experience by reducing the need for tedious manual transaction review and categorization, especially when the number of transactions to be reviewed is large. One challenge in automated transaction categorization is that different users may use different transaction categories. Thus, a capability to learn how a user associates transactions with his/her categories is desirable. User experience would be further enhanced by a capability for learning in near real time, for example, within a single transaction review session. In addition, previous methods of automated transaction categorization were limited to categorizing based on detecting precise string matches, unable to generalize to similar transactions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including executing a baseline classifier on unreviewed transaction features of an unreviewed transaction record to obtain a baseline account identifier, and executing a comparison model on (i) an unreviewed transaction vector of the unreviewed transaction record and (ii) reviewed transaction vectors to obtain comparison scores. The reviewed transaction vectors correspond to reviewed transaction records each having a user-approved account identifier. The method further includes selecting, using the comparison scores, a reviewed transaction record. The reviewed transaction record corresponds to a comparison score. The comparison score corresponds to a user-approved account identifier of the reviewed transaction record. The method further includes selecting, using the comparison score, one of the baseline account identifier and the user-approved account identifier to obtain a selected account identifier, and presenting the selected account identifier for the unreviewed transaction record.

In general, in one aspect, one or more embodiments relate to a system including a computer processor, and a recommendation engine executing on the computer processor and configured to execute a baseline classifier on unreviewed transaction features of an unreviewed transaction record to obtain a baseline account identifier, and execute a comparison model on (i) an unreviewed transaction vector of the unreviewed transaction record and (ii) reviewed transaction vectors to obtain comparison scores. The reviewed transaction vectors correspond to reviewed transaction records each having a user-approved account identifier. The recommendation engine is further configured to select, using the comparison scores, a reviewed transaction record. The reviewed transaction record corresponds to a comparison score. The comparison score corresponds to a user-approved account identifier of the reviewed transaction record. The recommendation engine is further configured to select, using the comparison score, one of the baseline account identifier and the user-approved account identifier to obtain a selected account identifier, and present the selected account identifier for the unreviewed transaction record.

In general, in one aspect, one or more embodiments relate to a method including obtaining, via a graphical user interface (GUI), an unreviewed transaction record and reviewed transaction records each having a user-approved account identifier and sending the unreviewed transaction record and the reviewed transaction records to a recommendation engine configured to perform: executing a baseline classifier on unreviewed transaction features of an unreviewed transaction record to obtain a baseline account identifier, and executing a comparison model on (i) an unreviewed transaction vector of the unreviewed transaction record and (ii) reviewed transaction vectors to obtain comparison scores. The reviewed transaction vectors correspond to reviewed transaction records each having a user-approved account identifier. The recommendation engine is further configured to perform selecting, using the comparison scores, a reviewed transaction record. The reviewed transaction record corresponds to a comparison score. The comparison score corresponds to a user-approved account identifier of the reviewed transaction record. The recommendation engine is further configured to perform recommending, using the comparison score, one of the baseline account identifier and the user-approved account identifier to obtain a recommended account identifier, and transmitting, to the GUI, the recommended account identifier for the unreviewed transaction record. The method further includes receiving, from the recommendation engine, the recommended account identifier for the unreviewed transaction record, and presenting, via the GUI, the recommended account identifier for the unreviewed transaction record.

Other aspects of the invention will be apparent from the following description and the appended claims.

DETAILED DESCRIPTION

Figure 1A:
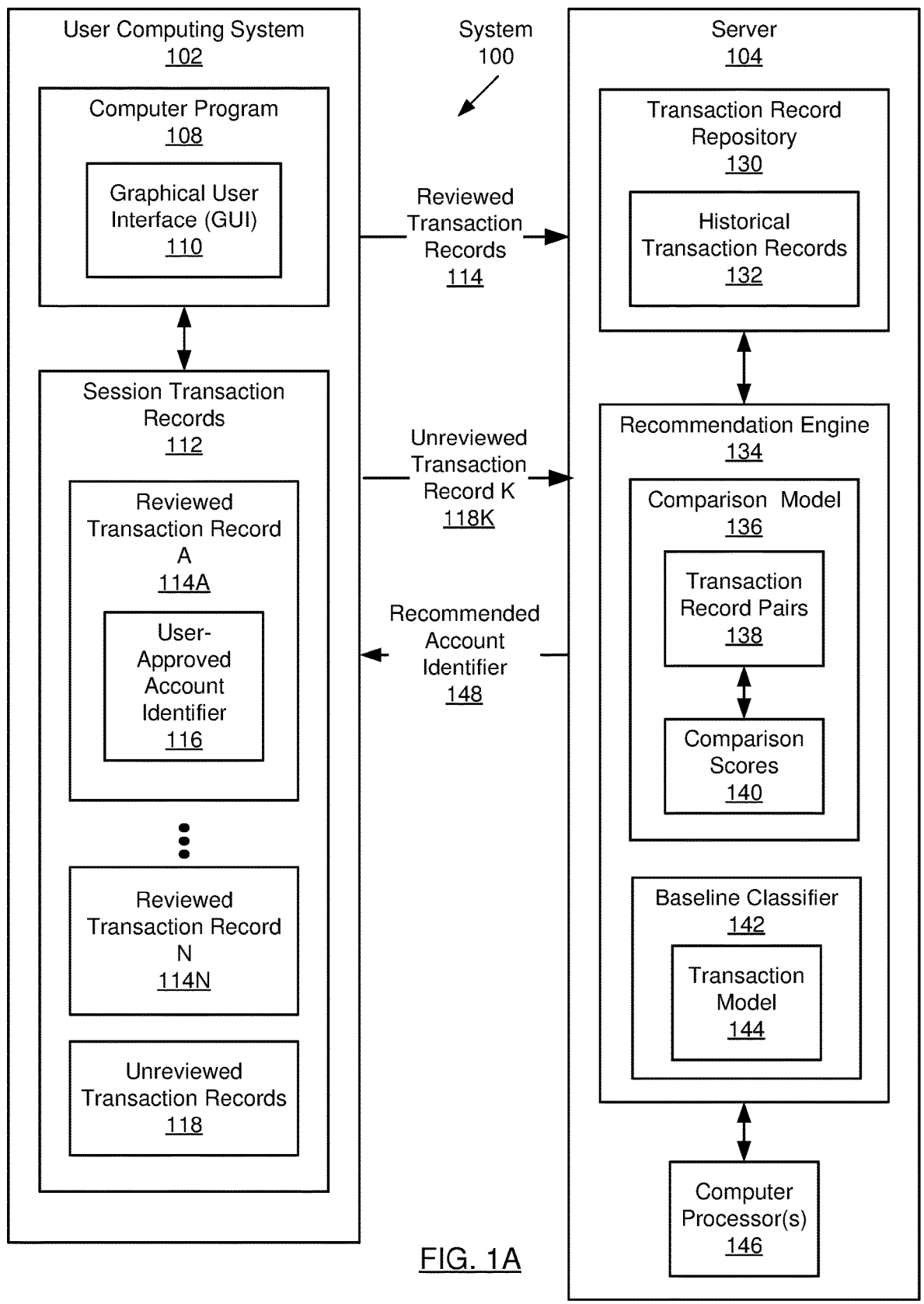
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

An account identifier is a value that uniquely identifies one of a number of accounts. The goal of transaction categorization is to recommend an account identifier for any given transaction. The disclosed invention provides a new automated transaction categorization capability. A baseline classifier is used to classify features of an unreviewed transaction record as a baseline account identifier, chosen from a collection of accounts (e.g., a chart of accounts). The baseline classifier includes a transaction model. Different types of transaction features may be embedded in a semantic space by different models and/or layers in a transaction model within the baseline classifier. For example, a payee name may be embedded by a name embedding model trained to learn word associations from a corpus of text. The output of the transaction model is an unreviewed transaction vector that corresponds to the unreviewed transaction record. The unreviewed transaction vector is then matched, by the baseline classifier, to an account vector. Account vectors are embedded in the same semantic space as the transaction vectors. For example, the account vector that is a nearest neighbor of the unreviewed transaction vector may be a best match to the unreviewed transaction vector.

A comparison model is executed on the unreviewed transaction vector and reviewed transaction vectors to obtain comparison scores. The comparison scores are measures of similarity between the unreviewed transaction record and the reviewed transaction records. Each reviewed transaction vector corresponds to a reviewed transaction record having a user-approved account identifier. The comparison model is a few-shot learning model that efficiently performs comparisons without classifying the comparison model's inputs. Leveraging the comparison model transforms the transaction categorization from a classification problem to a comparison problem. To reduce the $O(N^2)$ computational complexity of the training of the comparison model using transaction pairs, one or more embodiments leverage a baseline classifier to suppress the pairing of drastically different transactions. This makes the training of the comparison model more efficient.

The comparison scores may be used to select a set of transactions whose corresponding vectors are close enough to that of the unreviewed transaction. This set of transactions are considered to be the neighborhood of the unreviewed transaction. The model then makes recommendations as follows: it either recommends the account identifier from the baseline account classifier, or it derives a recommendation from the neighborhood from the comparison model, depending on whether the neighborhood's comparison score exceeds a threshold. The selected account identifier is presented to the user for review. The user may complete the review by confirming the account recommendation or overriding the account recommendation with a different account identifier of the user's choice. In either case, when the review of the unreviewed transaction record is complete, the account identifier with the user's final approval is assigned to the transaction record, and the new record is added to the collection of reviewed records. Thus, the newly reviewed transaction record becomes available for comparison with subsequently unreviewed transaction records enabling in-session learning in near real time.

FIG. 1A shows a diagram of a system (100) in accordance with one or more embodiments. As shown in FIG. 1A, the system (100) includes multiple components such as the user computing system (102) and a server (104). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user.

Different accounts may have different tax implications and accounting implications. An account may be a bookkeeping account that tracks credits and debits. A chart of accounts includes a listing of accounts that may be used for an entity. An entity may be a person or business. Each entity may have one or more users that access and utilize the system to view and categorize transaction records and assign accounts to transactions. A user may access the system on behalf of an entity to view and edit transaction records. Each entity may have a customized chart of accounts.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) may take the form of the computing system (500) shown in FIG. 5A connected to a network (520) as shown in FIG. 5B.

The user computing system (102) includes a computer program (108) and session transaction records (112). The computer program (108), in accordance with one or more embodiments, is a software application written in any programming language that includes executable instructions stored in some sort of memory. The instructions, when executed by one or more processors, enable a device to perform the functions described in accordance with one or more embodiments. The computer program (108) includes a graphical user interface (GUI) (110) for receiving input from a user and transmitting output to the user. The GUI (110) may be rendered and displayed within a local desktop software application or the GUI (110) may be generated by a remote web server and transmitted to a user's web browser executing locally on a desktop or mobile device.

The session transaction records (112) may be transaction records corresponding to (e.g., processed during) a session of the computer program (108). The session may span a period of time between a login by a user to the computer program (108) and a logout by the user from the computer program (108). For example, the session transaction records (112) may be transaction records downloaded by the computer program (108) (e.g., from a financial institution used by the user) during the session. Alternatively, the session transaction records (112) may be transaction records corresponding to multiple sessions of the computer program (108).

The transaction records are records of events involving a payee and an entity. The payee may be a vendor or other entity that provides a product and/or service to the entity in exchange for receiving an amount (e.g., a dollar amount) on a date. Each transaction record includes one or more transaction features. Transaction features are attributes of transactions records that are represented as alphanumeric data. The transaction features may include a payee name, transaction metadata, and/or transaction data. The transaction metadata may include: a standard industrial classification (SIC) code, tax form (e.g., Schedule C) code, etc. The transaction data may include: an amount, a date, an entity identifier, etc.

The session transaction records (112) include reviewed transaction records (114A, 114N) and unreviewed transaction records (118). A reviewed transaction record (114A) includes a user-approved account identifier (116). The user-approved account identifier (116) may be an identifier of an account included in a chart of accounts (COA) of the entity. For example, the user-approved account identifier (116) may be "accounts receivable", "accounts payable", "account 27", or any other unique identifier of an account included in the COA of the entity. The user-approved account identifier (116) may be an identifier that is assigned by the user. Alternatively, the user-approved account identifier (116) may be an account identifier that is presented by the GUI (110) and accepted by the user. For example, the account identifier presented by the GUI (110) may be a recommended account identifier (148) received from the recommendation engine (134). In contrast, the account identifier associated with an unreviewed transaction record (118) has not been reviewed by the user yet.

The computer program (108) includes functionality to send reviewed transaction records (114) and an unreviewed transaction record (118K) to the recommendation engine (134). The computer program (108) includes functionality to receive a recommended account identifier (148) from the recommendation engine (134).

The server (104) includes a transaction repository (130), a recommendation engine (134), and computer processor(s) (146). The transaction repository (130) is any type of storage unit and/or device (e.g., a file system, database, collection of tables, or any other storage mechanism) for storing data. Further, the transaction repository (130) may include multiple different storage units and/or devices. The multiple different storage units and/or devices may or may not be of the same type or located at the same physical site. The transaction repository (130) may be accessed online via a cloud service (e.g., Amazon Web Services, Egnyte, Azure, etc.).

The transaction repository (130) includes functionality to store historical transaction records (132). The historical transaction records (132) include transaction records of one or more entities.

The recommendation engine (134) includes a comparison model (136) and a baseline classifier (142). The comparison model (136) includes functionality to calculate comparison scores (140) for transaction record pairs (138). Each transaction record pair (138) includes two transaction records from the same entity, each of which may be a historical transaction record (132). The comparison model (136) is a machine learning model trained using transaction record pairs (138), as described below.

Figure 1B:
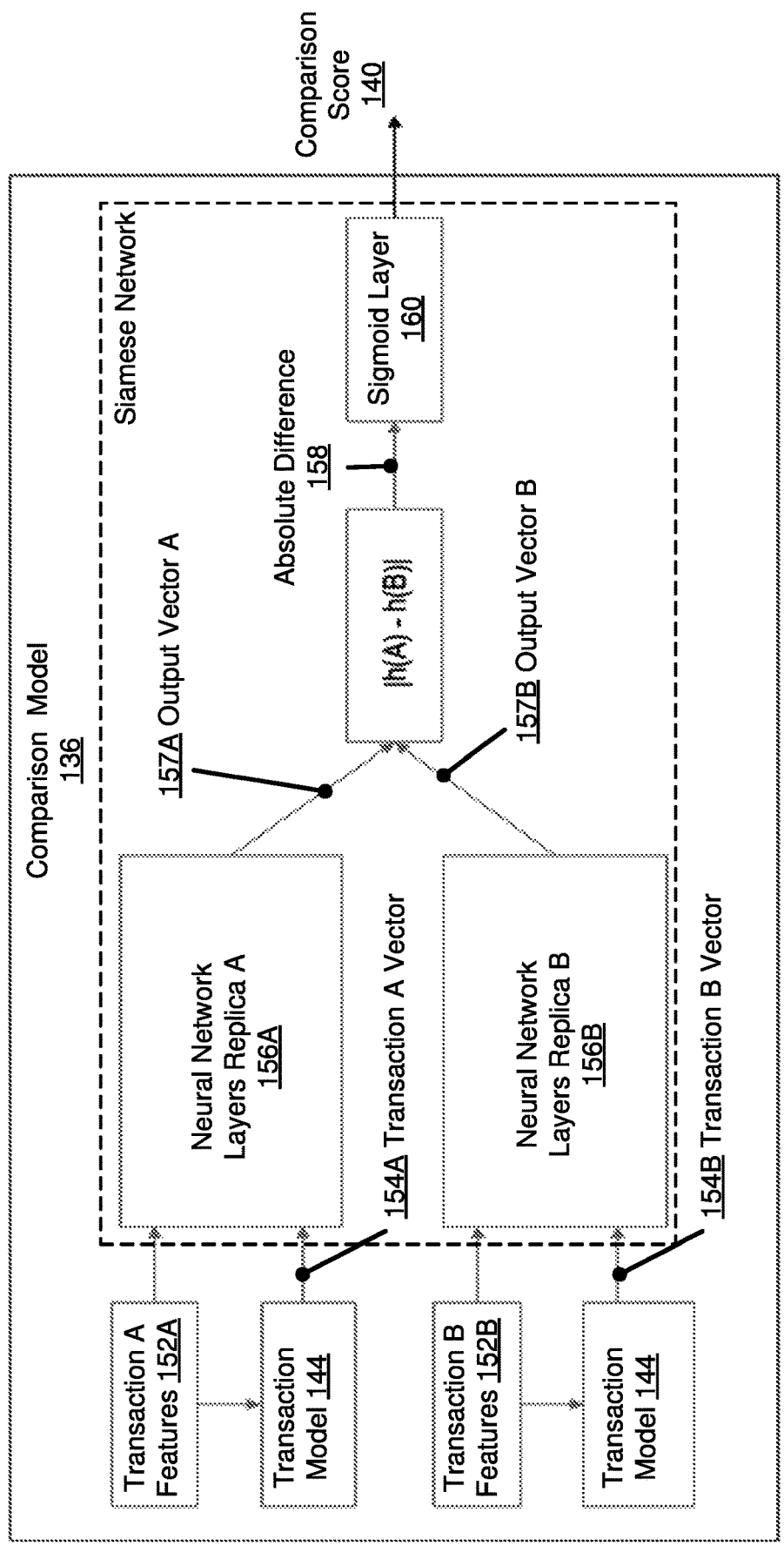

Turning to FIG. 1B, in one or more embodiments, the comparison model (136) includes a Siamese network. A Siamese network includes two identical replicas of neural network layers with the same structure and the same weights. One or more layers in the replicas of neural network layers are fully connected layers. A Siamese network is trained to learn a similarity function that compares inputs without classifying the inputs. Siamese networks are often applied in "few-shot learning" scenarios, where training is based on only a few samples, and an efficient (e.g., real time) comparison of a pair of input vectors is desired.

The comparison model (136) includes neural network layers replicas (156A, 156B) that include functionality to process transaction features (152A, 152B) and/or transaction vectors (154A, 154B) in parallel to compute output vectors (157A, 157B). The transaction vectors (154A, 154B) are generated using a transaction model (144) (see description of FIG. 1C below) that embeds transaction features (152A, 152B) of a transaction record pair (138) in a latent vector space in which similar transaction features are embedded in close proximity and dissimilar transaction features are embedded far apart.

The Siamese network includes functionality to calculate the element-wise absolute difference vector (158) between the output vectors (157A, 157B). The Siamese network includes functionality to apply a sigmoid layer (160) to the absolute difference (158) to generate a comparison score (140). The comparison score (140) quantifies the similarity between the transaction records in the transaction record pair (138) from which the transaction features (152A, 152B) and the transaction vectors (154A, 154B) were generated. According to the construction of the sigmoidal layer, the comparison score (140) is a normalized value between zero and one.

In one or more embodiments, a transaction vector (154A) is a combination (e.g., a concatenation) of one or more vectors generated from the transaction features (152A) of a transaction record. The transaction vector (154A) may be a vector (e.g., a point) in a multi-dimensional latent vector space.

The comparison model (136) may be trained using transaction record pairs (138) for the same entity where the baseline classifier (142) classifies both transaction records in the transaction record pair as the same account identifier. Having both transaction records in the transaction record pair classified as the same account identifier ensures that the transaction records in the transaction record pair have a degree of similarity. For example, a transaction record whose payee is a food vendor would not be paired with a transaction record whose payee is a home improvement vendor. Thus, the training data excludes transaction record pairs (138) that include dissimilar transaction records according to the baseline classifier (142). That is, the training data is sampled near the decision boundary of similar pairs, and apparently dissimilar pairs are suppressed. By filtering dissimilar transaction record pairs (138) from the training data, the number of transaction record pairs (138) in the training data of the comparison model (136) may be far less than the $O(N^2)$ possible combinations of transaction record pairs (138) that may be generated from N transaction records. A transaction record pair in the training data may be labeled as a positive sample when both transaction records in the transaction record pair have the same user-approved account identifier. Conversely, a transaction record pair in the training data may be labeled as a negative sample when both transaction records in the transaction record pair have different user-approved account identifiers.

Figure 1C:
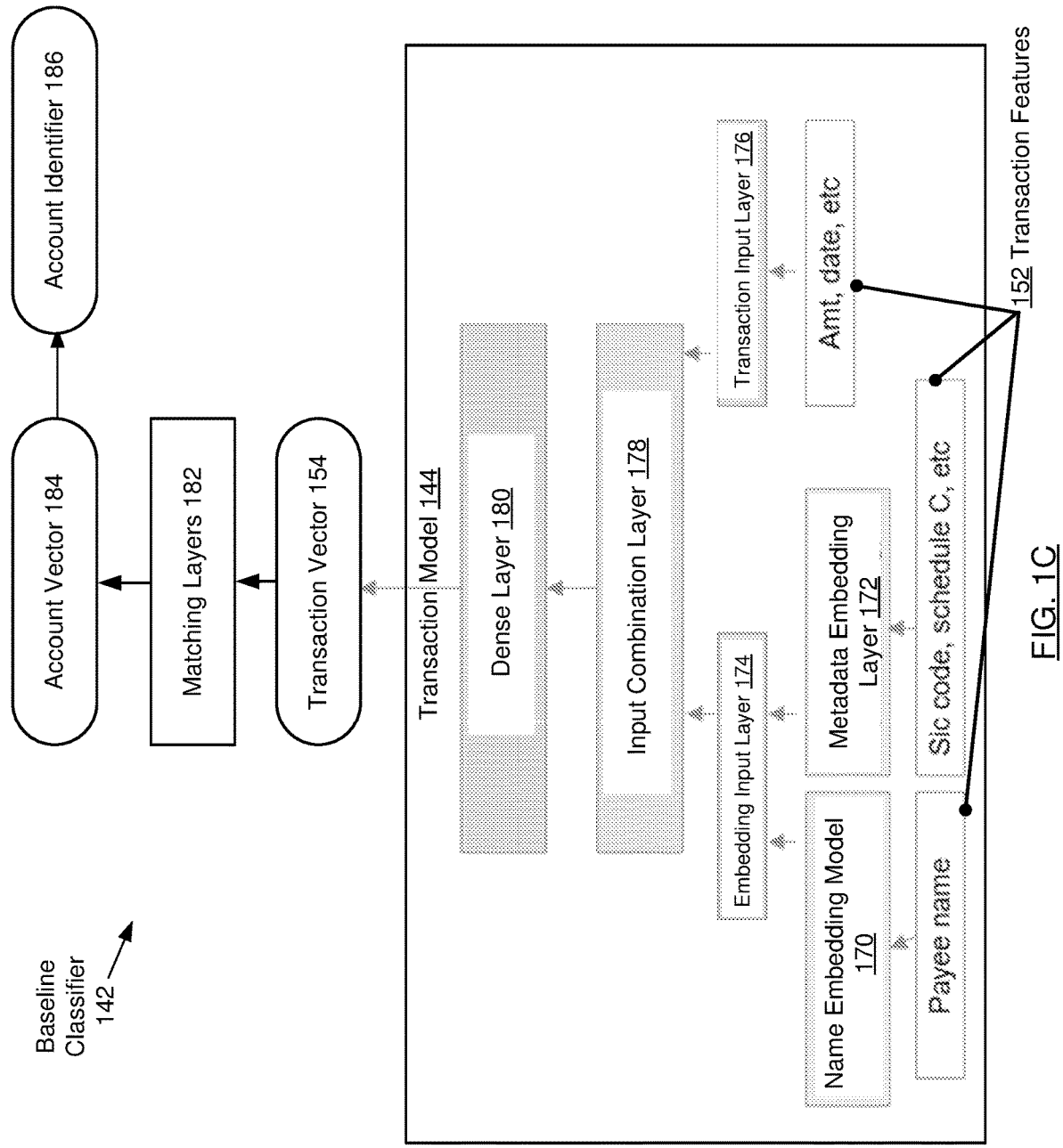

Turning to FIG. 1C, the baseline classifier (142) is a neural network model that includes functionality to classify transaction features (152) of a transaction record as an account identifier (186). The baseline classifier (142) includes a transaction model (144) and matching layers (182). The transaction model (144) is a neural network model that includes functionality to generate a transaction vector (154) from transaction features (152) of the transaction record.

The transaction model (144) may embed different transaction features (152) using different models and/or layers within the transaction model (144). For example, the payee name may be embedded by a name embedding model (170) of the transaction model (144). The name embedding model (170) includes functionality to generate a name embedding vector from the payee name. The name embedding model (170) is a neural network model that learns word associations from a corpus of text. When the name embedding model (170) generates, for two names (e.g., the identifiers of two different payees), name embedding vectors with similar values, then the names are similar. The name embedding vectors may be determined to have similar values when the cosine similarity of the name embedding vectors is close to 1 even though the individual names include different words and characters.

Similarly, transaction metadata may be embedded by a metadata embedding layer (172) of the transaction model (144). The metadata embedding layer (172) generates a metadata embedding vector from the transaction metadata (e.g., a standard industrial classification (SIC) code). The metadata embedding layer (172) may be a neural network that is an encoder that includes one or more layers or fully connected nodes to generate the metadata embedding vector. The output of the name embedding model (170) and the metadata embedding layer (172) is combined into an embedding input vector by an embedding input layer (174) of the transaction model (144). In one embodiment, the embedding input layer (174) is a neural network that includes one or more fully connected layers to generate the embedding input vector.

In addition, transaction data (e.g., amount, date, etc.) may be encoded by a transaction input layer (176) of the transaction model (144). In one embodiment, the transaction input layer (176) may be a neural network that includes one or more fully connected layers to generate a transaction input vector as output. Input combination layer (178) generates an output from the outputs of the embedding input layer (174) and the transaction input layer (176). In one embodiment, the input combination layer (178) is a neural network that includes one or more fully connected layers to generate an input combination vector as output. The dense layer (180) of the transaction model (144) generates the transaction vector (154) from the output of the input combination layer (178). In one embodiment, the dense layer (180) is a neural network that includes one or more fully connected layers.

The matching layers (182) include functionality to match a transaction vector (154) with an account vector (184). The account vector (184) corresponds to an account identifier (186). The matching layers (182) include functionality to embed, in the same semantic space used to embed transaction vectors, one or more account vectors each corresponding to an account identifier. The matching layers (182) may use an account embedding model to embed account identifiers as account vectors. The account embedding model may be trained on a corpus of text. For example, the corpus of text may include sentences including information (e.g., names) of various accounts included in (e.g., assigned to) historical transaction records (132). The account vector (184) that matches the transaction vector (154) may be a nearest neighbor (e.g., based on cosine similarity) of the transaction vector (154) in the semantic space. The matching layers (182) include functionality to calculate match scores between the transaction vector (154) and one or more account vectors.

In one or more embodiments, the computer processor(s) (146) takes the form of the computer processor(s) (502) described with respect to FIG. 5A and the accompanying description below. The computer processor (146) includes functionality to execute the recommendation engine (140).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
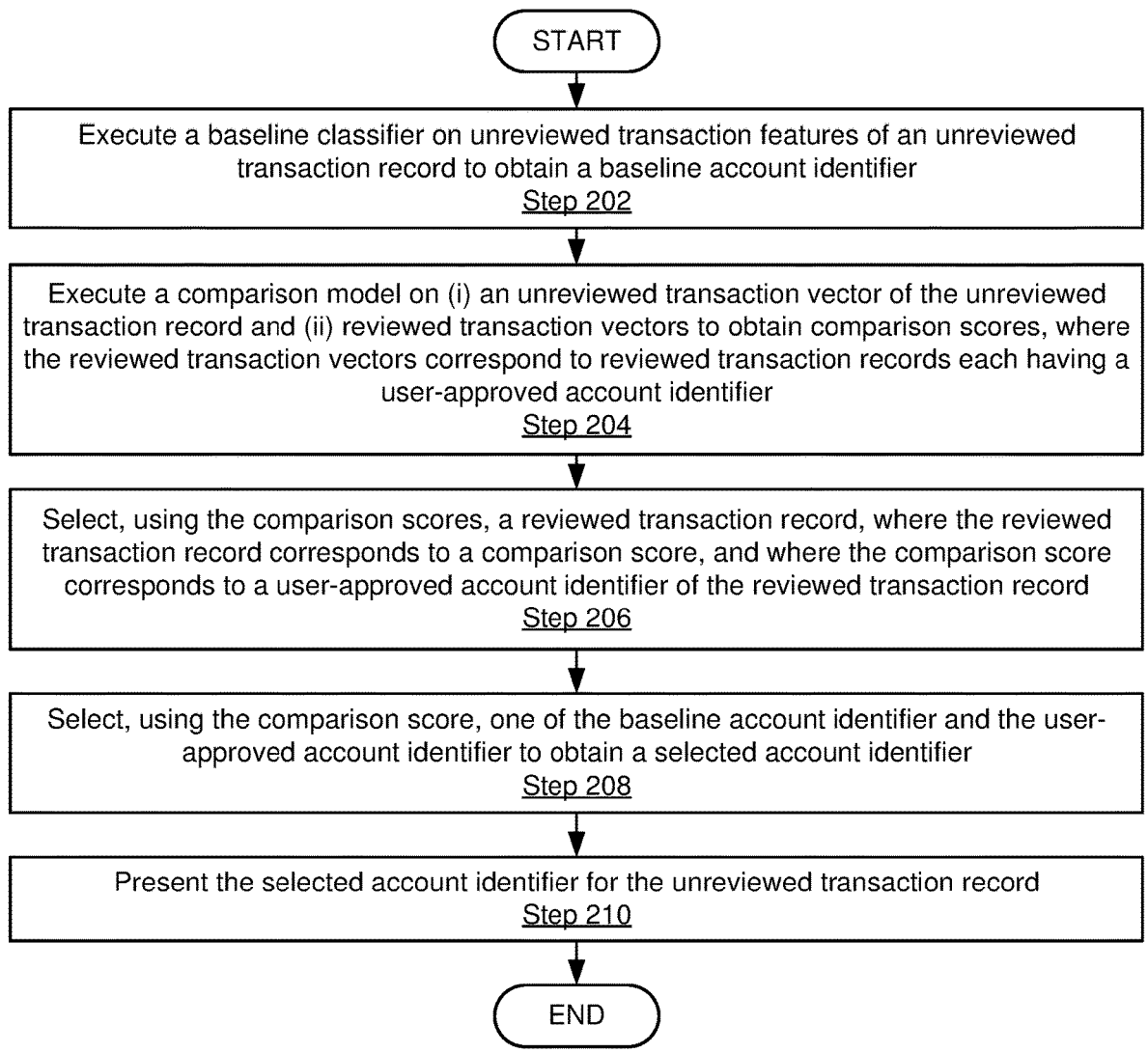
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for transaction categorization. One or more of the steps in FIG. 2 may be performed by the components (e.g., the recommendation engine (134) of the server (104) and the computer program (108) of the user computing system (102)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a baseline classifier is executed on unreviewed transaction features of an unreviewed transaction record to obtain a baseline account identifier. The recommendation engine extracts the transaction features from the unreviewed transaction record. Different transaction features may be embedded in a semantic space by different models and/or layers in a transaction model within the baseline classifier. For example, the payee name may be embedded by a name embedding model trained to learn word associations from a corpus of text. Transaction metadata may be embedded by a metadata embedding layer of the transaction model. Transaction data may be embedded by a transaction input layer of the transaction model.

The output of the transaction model is an unreviewed transaction vector that corresponds to the unreviewed transaction record. The unreviewed transaction vector is then matched, by matching layers of the baseline classifier, to an account vector. The output of the baseline classifier is the account identifier corresponding to the matching account vector.

The matching layers of the baseline classifier embed one or more account identifiers as one or more account vectors in the same semantic space used to embed the unreviewed transaction vector. The matching layers calculate matching scores between the unreviewed transaction vector and the one or more account vectors. For example, the account vector that is the nearest neighbor of the unreviewed transaction vector may be a best match to the unreviewed transaction vector. Continuing this example, the account vector with the highest cosine similarity relative to the unreviewed transaction vector may be the nearest neighbor of the unreviewed transaction vector.

In Step 204, a comparison model is executed on (i) an unreviewed transaction vector of the unreviewed transaction record and (ii) reviewed transaction vectors to obtain comparison scores. Each reviewed transaction vector corresponds to (e.g., matches) a reviewed transaction record having a user-approved account identifier. Each reviewed transaction vector corresponds to (e.g., matches) a comparison score. Thus, each comparison score corresponds to a user-approved account identifier of the respective reviewed transaction record.

The recommendation engine may use the transaction model to generate the reviewed transaction vectors from transaction features of the reviewed transaction records. The recommendation engine extracts the transaction features from the reviewed transaction records.

The comparison model calculates the comparison scores for transaction record pairs where each transaction record pair includes the unreviewed transaction record and one of the reviewed transaction records. Each comparison score is a measure of the similarity between the unreviewed transaction record and the respective reviewed transaction record. The inputs to the comparison model include the transaction features of the unreviewed transaction record and the transaction features of the respective reviewed transaction record, in addition to the unreviewed transaction vector and the respective reviewed transaction vector.

The reviewed transaction records may be received during a first session of the computer program. If the computer program determines that the number of reviewed transaction records is below a threshold, then the computer program may obtain additional reviewed transaction records from a second (e.g., previous) session of the computer program, so that the unreviewed transaction record may be compared with a larger pool of reviewed transaction records. The number of additional reviewed transaction records obtained from the second session may be limited by the size of a system cache of the user computing system.

In Step 206, a reviewed transaction record is selected using the comparison scores. The recommendation engine may select the reviewed transaction record based on a determination that the comparison score corresponding to the reviewed transaction vector is the highest of all the comparison scores. For example, the reviewed transaction vector may be the nearest neighbor of the unreviewed transaction vector. Alternatively, the recommendation engine may select a subset of the reviewed transaction records using the comparison scores. The subset of the reviewed transaction records may correspond to reviewed transaction vectors in a "nearest neighborhood" of the unreviewed transaction vector. For example, the subset may include reviewed transaction records whose comparison scores exceed a threshold. As another example, the subset may include reviewed transaction records with the top N comparison scores (e.g., the top 5 comparison scores).

In Step 208, one of the baseline account identifier and the user-approved account identifier is selected using the comparison score to obtain a selected account identifier. For example, the recommendation engine may select the user-approved account identifier when the comparison score exceeds a threshold, and may select the baseline account identifier when the comparison score is below the threshold. Alternatively, in a scenario where the recommendation engine has selected a subset of the reviewed transaction records, the recommendation engine may use a voting algorithm to select the account identifier. For example, the voting algorithm may weight the votes assigned to the respective user-approved account identifiers of the subset of the reviewed transaction records based on the comparison score corresponding to the respective reviewed transaction record. The recommendation engine may then select the user-approved account identifier with the most cumulative votes. For example, the subset of the reviewed transaction records may include three reviewed transaction records whose comparison scores exceed a threshold of 0.5, where reviewed transaction record 1 has user-approved account identifier ID1 and a comparison score of 0.9, reviewed transaction record 2 has user-approved account identifier ID2 and a comparison score of 0.7, and reviewed transaction record 3 has user-approved account identifier ID2 and a comparison score of 0.6. The recommendation engine may select user-approved account identifier ID2, which receives 1.3 votes, whereas user-approved account identifier ID1 only receives 0.9 votes.

In Step 210, the selected account identifier is presented for the unreviewed transaction record via the graphical user interface (GUI) of the computer program. For example, the selected account identifier may be presented as a value in a cell in a row corresponding to the unreviewed transaction record displayed in the GUI. Continuing this example, the cell may correspond to an "account identifier" or "transaction category" field in the row. Alternatively, the selected account identifier may be presented in a popup window in the GUI.

In response to presenting the selected account identifier, the computer program may detect an approval of an account identifier for the unreviewed transaction record, or a disapproval, in which case the user declines to approve the account identifier recommendation and instead chooses a different account identifier. The computer program may assign the final approved account identifier to the unreviewed transaction record. The computer program may then recategorize the unreviewed transaction record as a new reviewed transaction record and add the new reviewed transaction record to the reviewed transaction records. Thus, the new reviewed transaction record becomes available for comparison with additional unreviewed transaction records by executing the steps of FIG. 2 for the additional unreviewed transaction records.

Figure 3A:
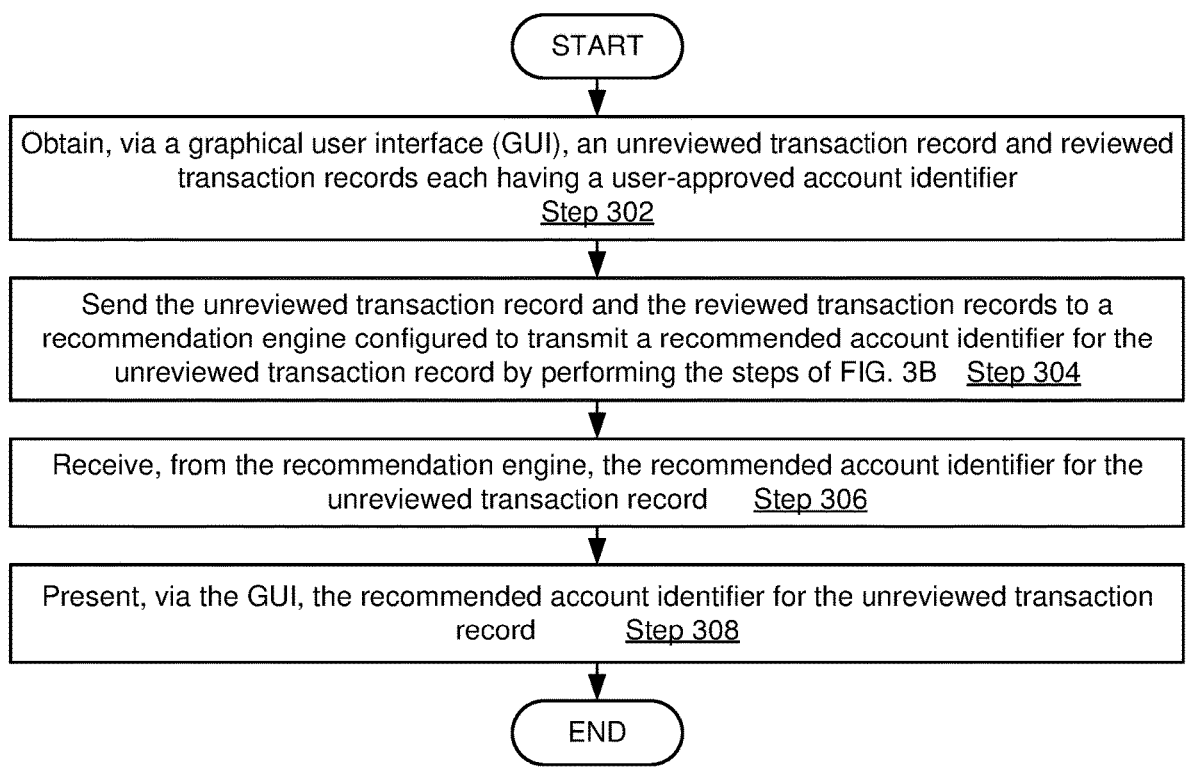

FIG. 3A shows a flowchart in accordance with one or more embodiments of the invention. The flowchart depicts a process for transaction categorization. One or more of the steps in FIG. 3A may be performed by the components (e.g., the recommendation engine (134) of the server (104) and the computer program (108) of the user computing system (102)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, an unreviewed transaction record and reviewed transaction records each having a user-approved account identifier are obtained, via a graphical user interface (GUI). The reviewed transaction records may be received during a first session of the computer program that includes the GUI. If the computer program determines that the number of reviewed transaction records is below a threshold, then the computer program may obtain additional reviewed transaction records from a second session of the computer program, so that the unreviewed transaction record may be compared with a larger pool of reviewed transaction records.

Figure 3B:
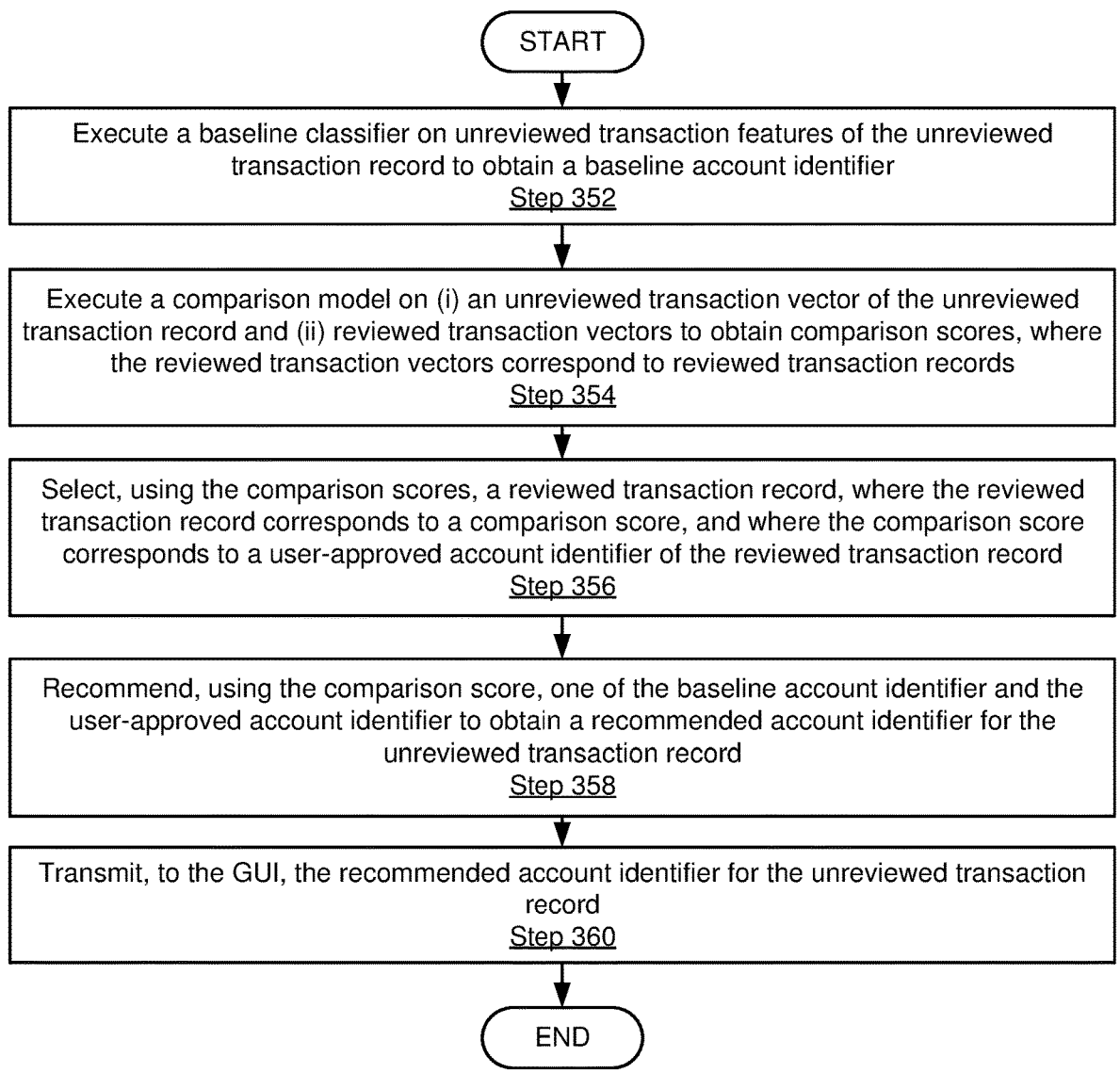

In Step 304, the unreviewed transaction record and the reviewed transaction records are sent to the recommendation engine configured to recommend a recommended account identifier for the unreviewed transaction record by performing the steps of FIG. 3B. The unreviewed transaction record and the reviewed transaction records may be sent to the recommendation engine over a network.

In Step 306, the recommended account identifier for the unreviewed transaction record is received from the recommendation engine. The recommended account identifier may be received from the recommendation engine via the network.

In Step 308, the recommended account identifier for the unreviewed transaction record is presented in the GUI (see description of Step 210 above).

FIG. 3B shows a flowchart in accordance with one or more embodiments of the invention. The flowchart depicts a process for transaction categorization. One or more of the steps in FIG. 3B may be performed by the components (e.g., the recommendation engine (134) of the server (104)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, a baseline classifier is executed on unreviewed transaction features of the unreviewed transaction record to obtain a baseline account identifier (see description of Step 202 above).

In Step 354, a comparison model is executed on (i) an unreviewed transaction vector of the unreviewed transaction record and (ii) reviewed transaction vectors to obtain comparison scores (see description of Step 204 above).

In Step 356, a reviewed transaction record is selected using the comparison scores (see description of Step 206 above).

In Step 358, one of the baseline account identifier and the user-approved account identifier is recommended using the comparison score to obtain a recommended account identifier (see description of Step 208 above).

In Step 360, the recommended account identifier for the unreviewed transaction record is transmitted to the GUI (see description of Step 210 above).

Figure 4A:
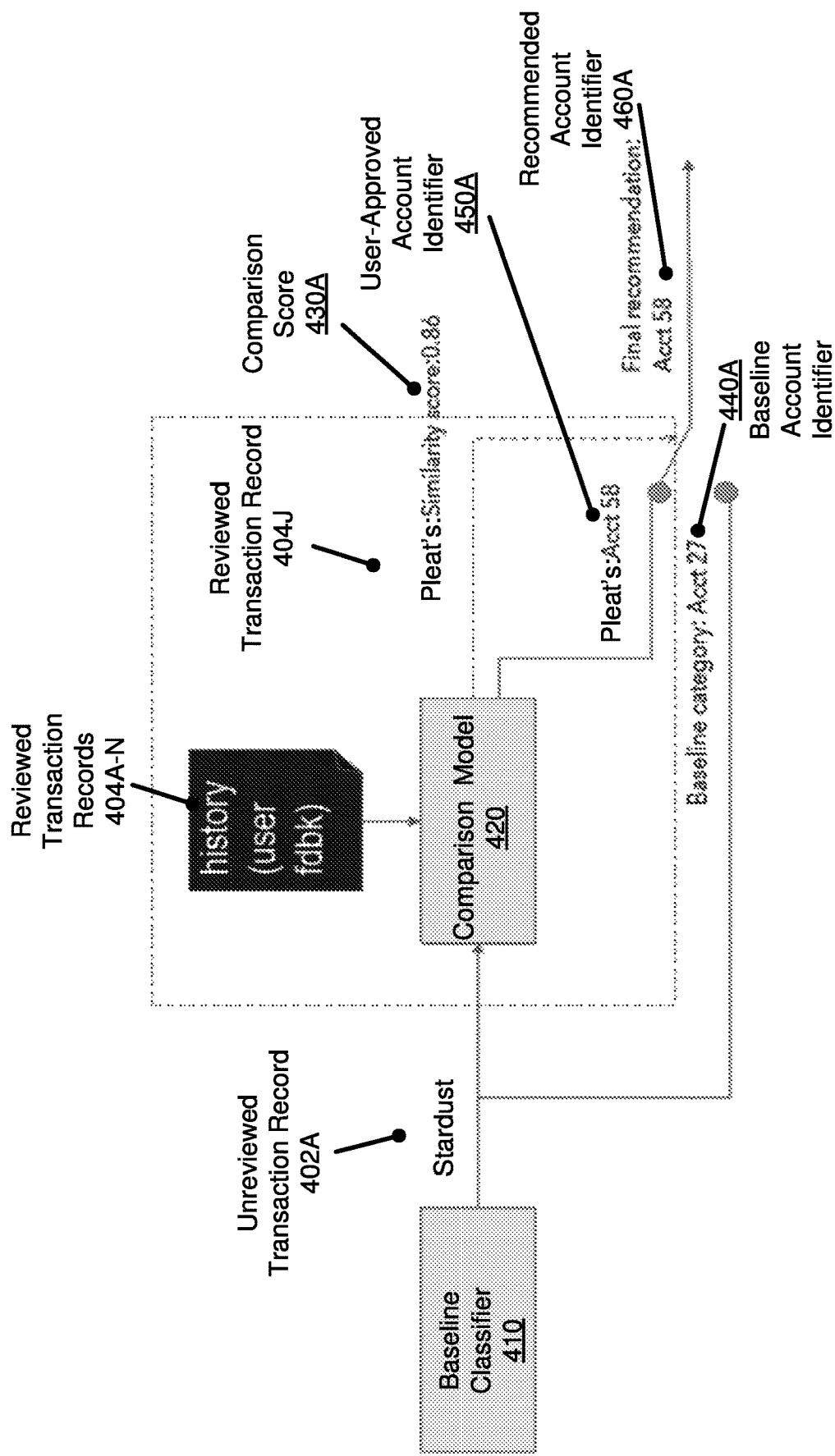
FIG. 4A and FIG. 4B show examples in accordance with one or more embodiments of the invention.
Figure 4B:
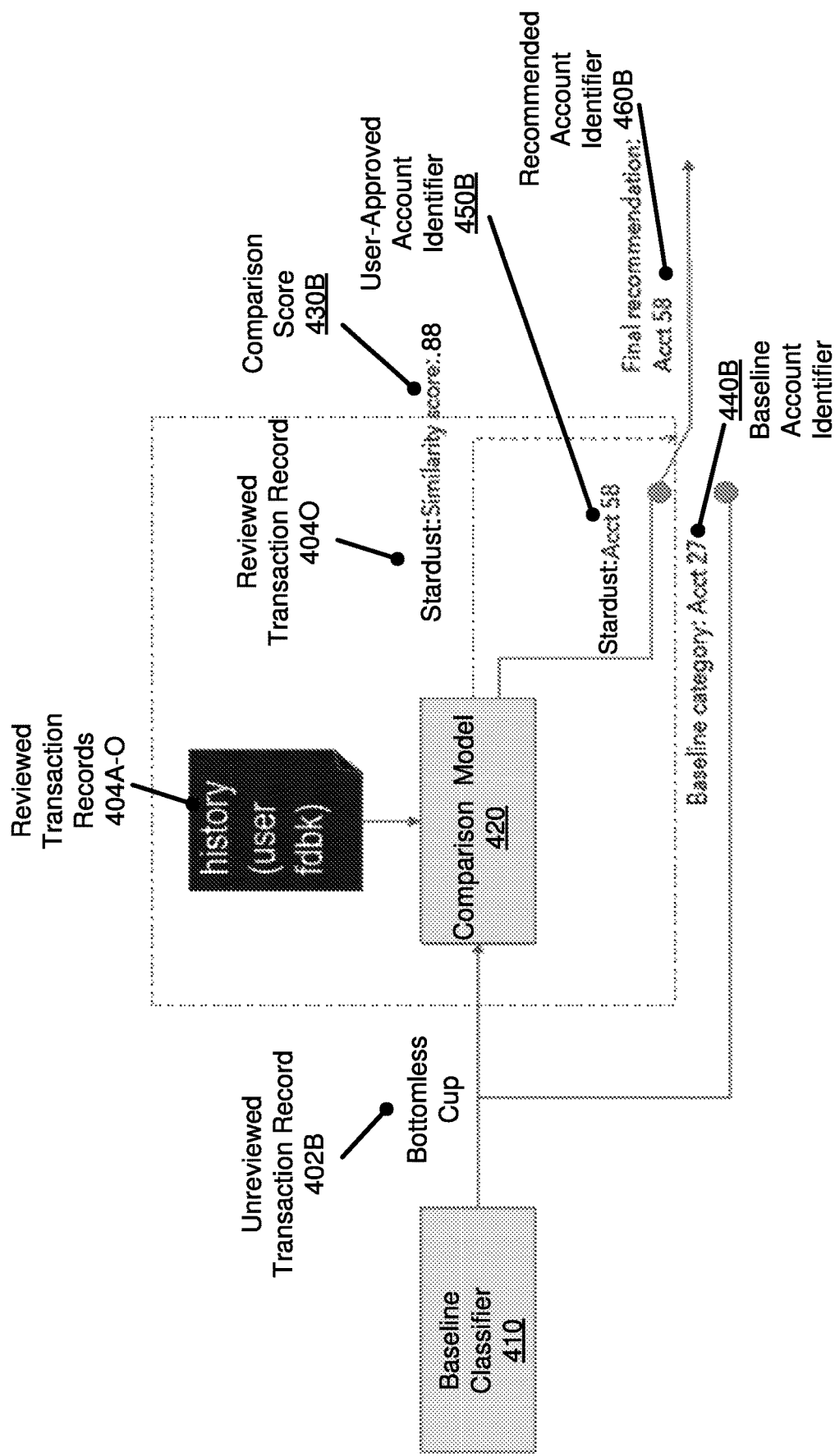

The following example is for explanatory purposes only and not intended to limit the scope of the invention. FIG. 4A and FIG. 4B show an implementation example in accordance with one or more embodiments of the invention. FIG. 4A shows an unreviewed transaction record (402A) ((118) in FIG. 1A) that has a payee transaction feature of "Stardust." FIG. 4A further shows reviewed transaction records (404A-N) ((114A, 114N) in FIG. 1A). The unreviewed transaction record (402A) and the reviewed transaction records (404A-N) are downloaded from a financial institution of a user during a session of a financial management computer program. The financial management computer program sends the unreviewed transaction record (402A) and the reviewed transaction records (404A-N) to the recommendation engine.

FIG. 4A shows that a baseline classifier (410) ((142) in FIG. 1A and FIG. 1C) is executed on transaction features of the unreviewed transaction record (402A) to yield baseline account identifier "Acct 27" (440A) as output. FIG. 4A further shows a comparison model (420) ((136) in FIG. 1A and FIG. 1B) executed on transaction features of the unreviewed transaction record (402A) and the reviewed transaction records (404A-N). The comparison model (420) generates comparison scores between the unreviewed transaction record (402A) and each of the reviewed transaction records (404A-N). In particular, FIG. 4A shows that the comparison model (420) generates comparison score 0.86 (430A) between the unreviewed transaction record (402A) and reviewed transaction record (404J) that has a payee transaction feature of "Pleat's." The comparison score 0.86 (430A) is the highest comparison score between the unreviewed transaction record (402A) and any of the reviewed transaction records (404A-N). Thus, reviewed transaction record (404J) is a nearest neighbor of the unreviewed transaction record (402A) relative to reviewed transaction records (404A-N).

Reviewed transaction record (404J) has the user-approved account identifier "Acct 58" (450A), which was assigned to reviewed transaction record (404J) by the user earlier in the session. Based on comparison score 0.86 (430A) exceeding a threshold of 0.8, the recommendation engine selects the user-approved account identifier "Acct 58" (450A) as a recommended account identifier (460A) for the unreviewed transaction record (402A). The recommendation engine then transmits, to the financial management computer program, the recommended account identifier "Acct 58" (460A) for the unreviewed transaction record (402A). A graphical user interface (GUI) of the financial management computer program then presents the recommended account identifier "Acct 58" (460A) for the unreviewed transaction record (402A). The financial management computer program subsequently detects an approval, by the user, of an account identifier for the unreviewed transaction record (402A). That is, the financial management computer program detects that the user has either approved the recommended account identifier "Acct 58" (460A) for the unreviewed transaction record (402A), or that the user has either approved some other account identifier for the unreviewed transaction record (402A). In this case, the financial management computer program detects that the user has approved the recommended account identifier "Acct 58" (460A) for the unreviewed transaction record (402A).

In response to detecting the approval, the computer program then recategorizes unreviewed transaction record (402A) as a new reviewed transaction (404O), and adds reviewed transaction (404O) to the reviewed transaction records (404A-O), as shown in FIG. 4B. FIG. 4B further shows an unreviewed transaction record (402B) that has a payee transaction feature of "Bottomless Cup." The financial management computer program sends the unreviewed transaction record (402B) and the new reviewed transaction (404O) to the recommendation engine.

FIG. 4B shows the next review cycle of another unreviewed transaction record (402B) after the transaction from the preceding paragraph (404O) has been added to the reviewed set. FIG. 4B shows that the baseline classifier (410) is executed on transaction features of the unreviewed transaction record (402B) to yield baseline account identifier "Acct 27" (440B) as output. FIG. 4B further shows the comparison model (420) executed on transaction features of the unreviewed transaction record (402B) and the reviewed transaction records (404A-O). The comparison model (420) generates comparison scores between the unreviewed transaction record (402A) and each of the reviewed transaction records (404A-O). In particular, FIG. 4B shows that the comparison model (420) generates a comparison score 0.88 (430B) between the unreviewed transaction record (402B) and reviewed transaction record (404O) that has a payee transaction feature of "Stardust." The comparison score 0.88 (430B) is the highest comparison score between the unreviewed transaction record (402B) and any of the reviewed transaction records (404A-O). Thus, reviewed transaction record (404O) is a nearest neighbor of the unreviewed transaction record (402B) relative to reviewed transaction records (404A-O).

Reviewed transaction record (404O) has the user-approved account identifier "Acct 58" (450B), which was assigned to reviewed transaction record (404O) by the user earlier in the session (see discussion of FIG. 4A above). Based on comparison score 0.88 (430B) exceeding the threshold of 0.8, the recommendation engine selects the user-approved account identifier "Acct 58" (450B) as a recommended account identifier (460B) for the unreviewed transaction record (402B). The recommendation engine then transmits, to the financial management computer program, the recommended account identifier "Acct 58" (460B) for the unreviewed transaction record (402B). The GUI of the financial management computer program then presents the recommended account identifier "Acct 58" (460B) for the unreviewed transaction record (402B). Thus, in-session learning has occurred, where the result of reviewing a transaction record is used to guide the classification of a subsequently reviewed transaction record within the same session of the financial management computer program.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
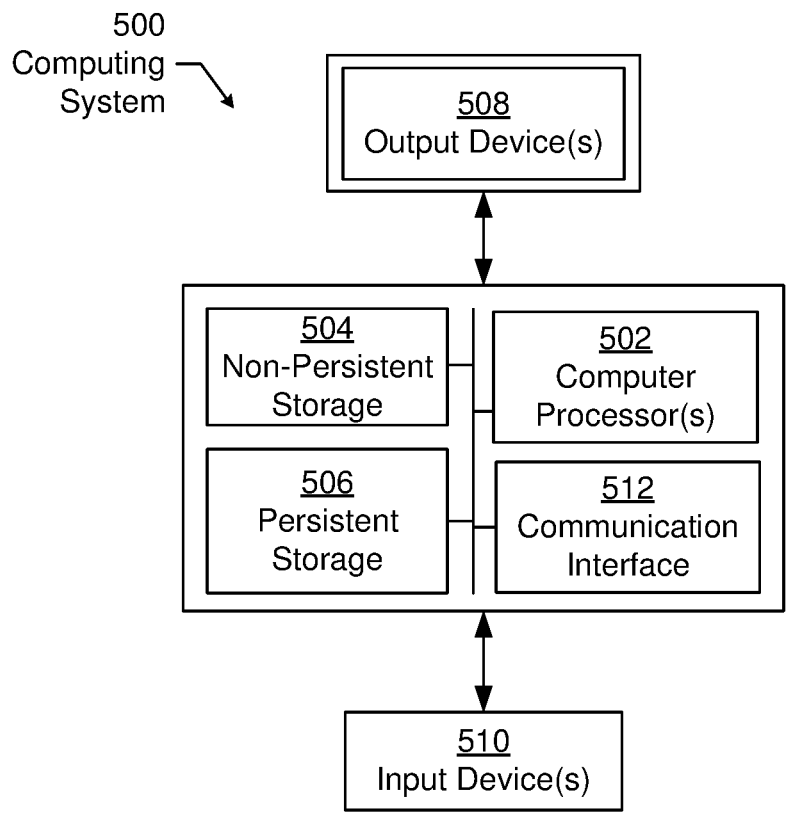
FIG. 5A and FIG. 5B show computing systems in accordance with one or more embodiments of the invention.
Figure 5B:
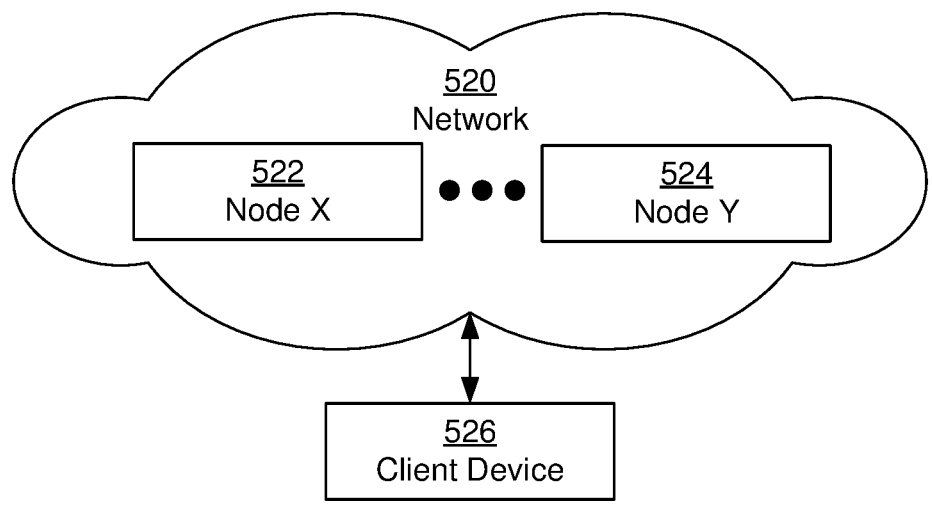

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of increasing a computational efficiency of a computer by reducing an $O(N^2)$ computational complexity of matching a first selected account identifier to one of a first baseline account identifier and a first user-approved account identifier from among a plurality of reviewed transaction records, the method comprising:
   executing a baseline classifier on first unreviewed transaction features of a first unreviewed transaction record to obtain the first baseline account identifier, wherein executing the baseline classifier suppresses a number of potential pairs of matching records in the plurality of reviewed transaction records;
   executing a comparison model on (i) a first unreviewed transaction vector of the first unreviewed transaction record and (ii) a plurality of reviewed transaction vectors to obtain a first plurality of comparison scores, the plurality of reviewed transaction vectors corresponding to the plurality of reviewed transaction records each having a user-approved account identifier, wherein the comparison model calculates the first plurality of comparison scores by:
      applying a series of neural network layers to the first unreviewed transaction vector to obtain an unreviewed output vector;
      applying the series of neural network layers to the plurality of reviewed transaction vectors to obtain a plurality of reviewed output vectors;
      calculating a plurality of absolute differences between the unreviewed output vector and the plurality of reviewed output vectors; and
      applying a sigmoid neural network layer to the plurality of absolute differences;
   selecting, using the first plurality of comparison scores, a first reviewed transaction record of the plurality of reviewed transaction records, the first reviewed transaction record corresponding to a first comparison score of the first plurality of comparison scores, the first comparison score corresponding to the first user-approved account identifier of the first reviewed transaction record;
   selecting, using the first comparison score, one of the first baseline account identifier and the first user-approved account identifier to obtain the first selected account identifier, wherein executing the baseline classifier reduces the $O(N^2)$ computational complexity to increase the computational efficiency of executing the comparison model, selecting the first reviewed transaction record, and obtaining the first selected account identifier; and
   presenting the first selected account identifier for the first unreviewed transaction record.

2. The method of claim 1, further comprising:
   extracting the first unreviewed transaction features from the first unreviewed transaction record; and
   extracting a plurality of reviewed transaction features from the plurality of reviewed transaction records,
   wherein the comparison model is further executed on the first unreviewed transaction features and the plurality of reviewed transaction features.

3. The method of claim 1, further comprising:
   in response to the presenting, detecting an approval of the first user-approved account identifier for the first unreviewed transaction record;
   in response to detecting the approval, recategorizing the first unreviewed transaction record as a new reviewed transaction record having the first user-approved account identifier; and
   adding the new reviewed transaction record to the plurality of reviewed transaction records to obtain a modified plurality of reviewed transaction records.

4. The method of claim 3, wherein the first unreviewed transaction record, a second unreviewed transaction record, and the plurality of reviewed transaction records are received during a session of a computer program, and wherein the new reviewed transaction record is added to the plurality of reviewed transaction records during the session of the computer program, the method further comprising:
   executing the baseline classifier on second unreviewed transaction features of the second unreviewed transaction record to obtain a second baseline account identifier;
   executing the comparison model on (i) a second unreviewed transaction vector of the second unreviewed transaction record and (ii) the modified plurality of reviewed transaction records to obtain a second plurality of comparison scores;

selecting, using the second plurality of comparison scores, the new reviewed transaction record of the modified plurality of reviewed transaction records, the new reviewed transaction record corresponding to a second comparison score of the second plurality of comparison scores, the second comparison score corresponding to the first user-approved account identifier of the new reviewed transaction record;

selecting, using the second comparison score, one of the second baseline account identifier and the first user-approved account identifier to obtain a second selected account identifier; and presenting the second selected account identifier for the second unreviewed transaction record.

5. The method of claim 1, further comprising:

generating a plurality of transaction record pairs each comprising a first transaction record and a second transaction record, the first transaction record and the second transaction record both corresponding to a same entity;

embedding the first transaction record and the second transaction record to obtain a first transaction vector and a second transaction vector;

executing the baseline classifier on the first transaction vector and the second transaction vector to obtain a second baseline account identifier and a third baseline account identifier;

determining that the second baseline account identifier matches the third baseline account identifier; and in response to determining that the second baseline account identifier matches the third baseline account identifier, adding a respective transaction record pair from the plurality of transaction record pairs to a training set of the comparison model.

6. The method of claim 1, further comprising:

executing the baseline classifier on second unreviewed transaction features of a second unreviewed transaction record to obtain a second baseline account identifier;

executing the comparison model on (i) a second unreviewed transaction vector of the second unreviewed transaction record and (ii) the plurality of reviewed transaction vectors to obtain a second plurality of comparison scores;

selecting, using the second plurality of comparison scores, a first subset of the plurality of reviewed transaction records, the first subset of the plurality of reviewed transaction records corresponding to a second subset of the second plurality of comparison scores, the second subset of the second plurality of comparison scores corresponding to a plurality of user-approved account identifiers of the first subset of the plurality of reviewed transaction records;

selecting, using the second plurality of comparison scores, one of the second baseline account identifier and one of the plurality of user-approved account identifiers to obtain a second selected account identifier; and presenting the second selected account identifier for the second unreviewed transaction record.

7. The method of claim 1, wherein the plurality of reviewed transaction records are received during a first session of a computer program, the method further comprising:

determining that a number of reviewed transaction records in the plurality of reviewed transaction records is below a threshold; and in response to determining that the number of reviewed transaction records is below the threshold:

obtaining at least one reviewed transaction record received during a second session of the computer program; and adding, to the plurality of reviewed transaction records, the at least one reviewed transaction record received during the second session.

8. A system for increasing a computational efficiency of a computer by reducing an $O(N^2)$ computational complexity of matching a first selected account identifier to one of a first baseline account identifier and a first user-approved account identifier from among a plurality of reviewed transaction records, the system comprising:

a computer processor; and a recommendation engine executing on the computer processor and configured to:

executing a baseline classifier on first unreviewed transaction features of a first unreviewed transaction record to obtain the first baseline account identifier, wherein executing the baseline classifier suppresses a number of potential pairs of matching records in the plurality of reviewed transaction records, executing a comparison model on (i) a first unreviewed transaction vector of the first unreviewed transaction record and (ii) a plurality of reviewed transaction vectors to obtain a first plurality of comparison scores, the plurality of reviewed transaction vectors corresponding to the plurality of reviewed transaction records each having a user-approved account identifier, wherein the comparison model calculates the first plurality of comparison scores by:

applying a series of neural network layers to the first unreviewed transaction vector to obtain an unreviewed output vector, applying the series of neural network layers to the plurality of reviewed transaction vectors to obtain a plurality of reviewed output vectors, calculating a plurality of absolute differences between the unreviewed output vector and the plurality of reviewed output vectors, and applying a sigmoid neural network layer to the plurality of absolute differences, select, using the first plurality of comparison scores, a first reviewed transaction record of the plurality of reviewed transaction records, the first reviewed transaction record corresponding to a first comparison score of the first plurality of comparison scores, the first comparison score corresponding to the first user-approved account identifier of the first reviewed transaction record, selecting, using the first comparison score, one of the first baseline account identifier and the first user-approved account identifier to obtain the first selected account identifier, wherein executing the baseline classifier reduces the $O(N^2)$ computational complexity to increase the computational efficiency of executing the comparison model, selecting the first reviewed transaction record, and obtaining the first selected account identifier, and present the first selected account identifier for the first unreviewed transaction record.

9. The system of claim 8, wherein the recommendation engine is further configured to:

extract the first unreviewed transaction features from the first unreviewed transaction record, and extract a plurality of reviewed transaction features from the plurality of reviewed transaction records, wherein the comparison model is further executed on the first unreviewed transaction features and the plurality of reviewed transaction features.

10. The system of claim 8, wherein the recommendation engine is further configured to:

in response to presenting the first selected account identifier, detect an approval of the first user-approved account identifier for the first unreviewed transaction record, in response to detecting the approval, recategorize the first unreviewed transaction record as a new reviewed transaction record having the first user-approved account identifier, and add the new reviewed transaction record to the plurality of reviewed transaction records to obtain a modified plurality of reviewed transaction records.

11. The system of claim 10, wherein the first unreviewed transaction record, a second unreviewed transaction record, and the plurality of reviewed transaction records are received during a session of a computer program, wherein the new reviewed transaction record is added to the plurality of reviewed transaction records during the session of the computer program, and wherein the recommendation engine is further configured to:

execute the baseline classifier on second unreviewed transaction features of the second unreviewed transaction record to obtain a second baseline account identifier, execute the comparison model on (i) a second unreviewed transaction vector of the second unreviewed transaction record and (ii) the modified plurality of reviewed transaction records to obtain a second plurality of comparison scores, select, using the second plurality of comparison scores, the new reviewed transaction record of the modified plurality of reviewed transaction records, the new reviewed transaction record corresponding to a second comparison score of the second plurality of comparison scores, the second comparison score corresponding to the first user-approved account identifier of the new reviewed transaction record, select, using the second comparison score, one of the second baseline account identifier and the first user-approved account identifier to obtain a second selected account identifier, and present the second selected account identifier for the second unreviewed transaction record.

12. The system of claim 8, wherein the recommendation engine is further configured to:

generate a plurality of transaction record pairs each comprising a first transaction record and a second transaction record, the first transaction record and the second transaction record both corresponding to a same entity, embed the first transaction record and the second transaction record to obtain a first transaction vector and a second transaction vector, execute the baseline classifier to the first transaction vector and the second transaction vector to obtain a second baseline account identifier and a third baseline account identifier, determine that the second baseline account identifier matches the third baseline account identifier, and in response to determining that the second baseline account identifier matches the third baseline account identifier, add a respective transaction record pair from the plurality of transaction record pairs to a training set of the comparison model.

13. The system of claim 8, wherein the recommendation engine is further configured to:

execute the baseline classifier on second unreviewed transaction features of a second unreviewed transaction record to obtain a second baseline account identifier, execute the comparison model on (i) a second unreviewed transaction vector of the second unreviewed transaction record and (ii) the plurality of reviewed transaction vectors to obtain a second plurality of comparison scores, select, using the second plurality of comparison scores, a first subset of the plurality of reviewed transaction records, the first subset of the plurality of reviewed transaction records corresponding to a second subset of the second plurality of comparison scores, the second subset of the second plurality of comparison scores corresponding to a plurality of user-approved account identifiers of the first subset of the plurality of reviewed transaction records, select, using the second plurality of comparison scores, one of the second baseline account identifier and one of the plurality of user-approved account identifiers to obtain a second selected account identifier, and present the second selected account identifier for the second unreviewed transaction record.

14. The system of claim 8, wherein the plurality of reviewed transaction records are received during a first session of a computer program, and wherein the recommendation engine is further configured to:

determine that a number of reviewed transaction records in the plurality of reviewed transaction records is below a threshold, and in response to determining that the number of reviewed transaction records is below the threshold:

obtain at least one reviewed transaction record received during a second session of the computer program, and add, to the plurality of reviewed transaction records, the at least one reviewed transaction record received during the second session.

15. A method of increasing a computational efficiency of a computer by reducing an $O(N^2)$ computational complexity of matching a first selected account identifier to one of a first baseline account identifier and a first user-approved account identifier from among a plurality of reviewed transaction records, the method comprising:

obtaining, via a graphical user interface (GUI), a first unreviewed transaction record and the plurality of reviewed transaction records each having a user-approved account identifier;

sending the first unreviewed transaction record and the plurality of reviewed transaction records to a recommendation engine configured to perform;

executing a baseline classifier on first unreviewed transaction features of the first unreviewed transaction record to obtain the first baseline account identifier, wherein executing the baseline classifier suppresses a number of potential pairs of matching records in the plurality of reviewed transaction records;

executing a comparison model on (i) a first unreviewed transaction vector of the first unreviewed transaction record and (ii) a plurality of reviewed transaction vectors to obtain a first plurality of comparison scores, the plurality of reviewed transaction vectors corresponding to the plurality of reviewed transaction records, wherein the comparison model calculates the first plurality of comparison scores by:
  applying a series of neural network layers to the first unreviewed transaction vector to obtain an unreviewed output vector;
  applying the series of neural network layers to the plurality of reviewed transaction vectors to obtain a plurality of reviewed output vectors;
  calculating a plurality of absolute differences between the unreviewed output vector and the plurality of reviewed output vectors; and
  applying a sigmoid neural network layer to the plurality of absolute differences;
selecting, using the first plurality of comparison scores, a first reviewed transaction record of the plurality of reviewed transaction records, the first reviewed transaction record corresponding to a first comparison score of the first plurality of comparison scores, the first comparison score corresponding to the first user-approved account identifier of the first reviewed transaction record;
recommending, using the first comparison score, one of the first baseline account identifier and the first user-approved account identifier to obtain a first recommended account identifier, wherein executing the baseline classifier reduces the $O(N^2)$ computational complexity to increase the computational efficiency of executing the comparison model, selecting the first reviewed transaction record, and obtaining the first selected account identifier; and
transmitting, to the GUI, the first recommended account identifier for the first unreviewed transaction record;
receiving, from the recommendation engine, the first recommended account identifier for the first unreviewed transaction record; and
presenting, via the GUI, the first recommended account identifier for the first unreviewed transaction record.

16. The method of claim 15, further comprising:
extracting the first unreviewed transaction features from the first unreviewed transaction record; and
extracting a plurality of reviewed transaction features from the plurality of reviewed transaction records, wherein the comparison model is further executed on the first unreviewed transaction features and the plurality of reviewed transaction features.

17. The method of claim 15, further comprising:
in response to the presenting, detecting an approval of the first user-approved account identifier for the first unreviewed transaction record;
in response to detecting the approval, recategorizing the first unreviewed transaction record as a new reviewed transaction record having the first user-approved account identifier; and
adding the new reviewed transaction record to the plurality of reviewed transaction records to obtain a modified plurality of reviewed transaction records.

18. The method of claim 17, wherein the first unreviewed transaction record, a second unreviewed transaction record, and the plurality of reviewed transaction records are received during a session of a computer program, and wherein the new reviewed transaction record is added to the plurality of reviewed transaction records during the session of the computer program, the method further comprising:
executing the baseline classifier on second unreviewed transaction features of the second unreviewed transaction record to obtain a second baseline account identifier;
executing the comparison model on (i) a second unreviewed transaction vector of the second unreviewed transaction record and (ii) the modified plurality of reviewed transaction records to obtain a second plurality of comparison scores;
selecting, using the second plurality of comparison scores, the new reviewed transaction record of the modified plurality of reviewed transaction records, the new reviewed transaction record corresponding to a second comparison score of the second plurality of comparison scores, the second comparison score corresponding to the first user-approved account identifier of the new reviewed transaction record;
selecting, using the second comparison score, one of the second baseline account identifier and the first user-approved account identifier to obtain a second selected account identifier; and
presenting the second selected account identifier for the second unreviewed transaction record.

* * * * *